United States Patent Office.

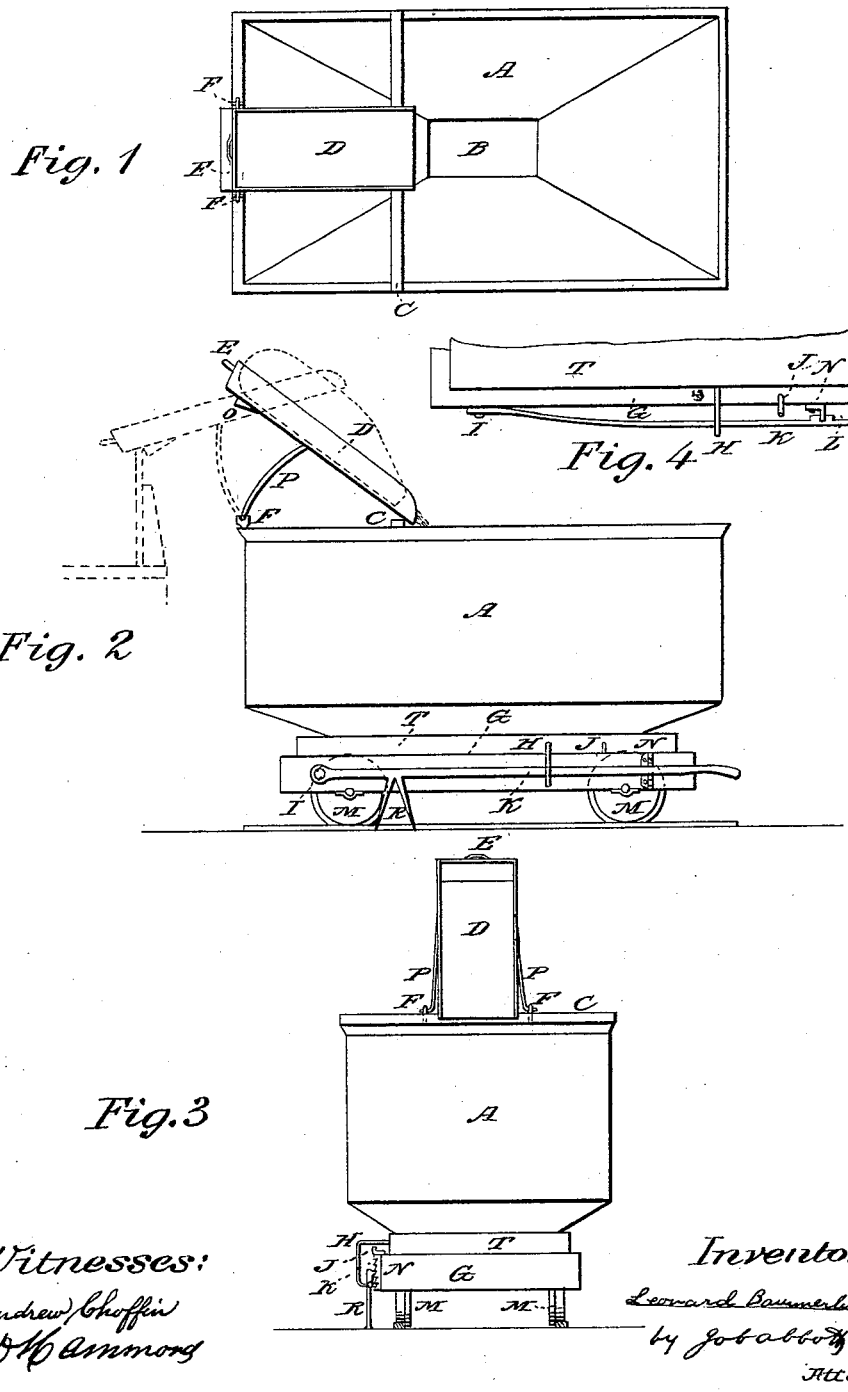

LEONARD BAMMERLIN, OF MASSILLON, OHIO.

Letters Patent No. 110,724, dated January 3, 1871.

IMPROVEMENT IN GRAIN-DUMPING CARS.

The Schedule referred to in these Letters Patent and making part of the same.

*To all whom it may concern:*

Be it known that I, LEONARD BAMMERLIN, of Massillon, Stark county, Ohio, have invented certain Improvements in Grain-Dumping Cars; and that the following is a full, clear, and exact specification thereof.

Nature and Objects of my Invention.

My invention relates to certain improvements in the dumping-cars used in grain-warehouses, into which the grain is dumped from the bags in the farmers' wagons, and in which it is weighed and carried to the elevator; and The first part of my invention relates to the construction of a tilting grain-trough, which is supported by pivoted arms on the side of the car-body in such a manner as to allow of its being tilted back against the wagon to receive the bags containing the grain, which is then poured into the car by tilting the trough forward so as to cause the grain to run out of the bag, by which much of the labor of raising and holding the bags over the side of the wagon is avoided and the danger of spilling the grain is materially diminished.

The second part of my invention consists in the combination of a stop-lever with pointed legs and a ratchet-bar with the frame of the car-truck, by means of which I am enabled to fasten the car securely in any desired position so as to prevent any danger of its moving along the track, thus preventing the danger of spilling the grain in unloading from the wagon by reason of the moving of the car away from the wagon, and also preventing any inconvenience resulting from the movement of the car on the scales in weighing or while discharging the grain at the elevator.

Description of Accompanying Drawing.

Figure 1 is a plan of a car embodying my invention.

Figure 2 is a side view of the same.

Figure 3 is an end view of the same.

Figure 4 is a detached plan of a portion of the car-truck showing the stop-lever and its fixtures.

General Description.

A represents the car-body, which is made with a sloping bottom, in which is arranged a drop-door, B, through which the grain is discharged from the car to the elevator.

G is the truck-frame, which is supported on the wheels M M, and on which is arranged the platform T, which supports the car-body A.

The tilting grain-trough D has the supporting-arms P P secured on its under side, and the ends of these arms are pivoted in the eyes F F, which are secured in the side of the car-body A.

The cross-bar C is secured across the car-body A, and serves as a rest to limit the downward movement of the trough D; and the handle E and stop O are attached to the end of the trough D, for convenience in handling the trough and holding it in position on the wagon.

In using the trough the farmer drives his wagon alongside the car, and tilts the trough D over onto the side of his wagon by means of the handle E, as indicated by dotted lines in fig. 2. He then places the bag containing the grain in the trough D, and, by means of the handle E, throws the trough forward, as shown by full lines, by which the grain is discharged into the car-body A.

In order to prevent the car from moving on the track away from the wagon, I pivot the stop-lever K to the truck-frame G by means of the bolt I, and secure the ratchet-plate N to said frame, as shown.

The pointed legs R are formed on the stop-lever K, and the lip L is formed on one side of said lever, as shown, so that by pressing down on the free end of the lever K the ends of the legs are forced down into the floor or ground, thus holding the car from any movement.

The lever K is fastened down by moving the lip L under one of the notches in the ratchet-plate N, and the lever is supported when not in use by placing it over the pin J.

The guide-rod H holds the lever against any considerable side movement.

Claims.

What I claim as new herein, and desire to secure by Letters Patent, is—

1. The tilting grain-trough D, provided with the supporting-arms P P, and pivoted on the side of the car-box A, substantially as and for the purpose specified.

2. The stop-lever K, provided with the pointed legs R, in combination with the car-truck G and the ratchet-bar N, substantially as and for the purpose specified.

As evidence of the foregoing witness my hand this 4th day of November, A. D. 1870.

LEONARD BAMMERLIN.

Witnesses:
ISAAC H. BROWN,
J. C. BROWN.